United States Patent
Goldberg et al.

(10) Patent No.: US 7,937,285 B2
(45) Date of Patent: May 3, 2011

(54) REMOTE COLLABORATIVE CONTROL AND DIRECTION

(75) Inventors: Kenneth Y Goldberg, San Francisco, CA (US); Judith Donath, Boston, MA (US); Eric J. Paulos, San Francisco, CA (US); David Pescovitz, San Francisco, CA (US); Kelly Dobson, Cambridge, MA (US); Matthew Lee, Cambridge, MA (US); Anthony Levandowski, Albany, CA (US); Dezhen Song, Albany, CA (US); Dana Spiegel, Boston, MA (US); Derek Tang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 2028 days.

(21) Appl. No.: 10/121,955

(22) Filed: Apr. 12, 2002

(65) Prior Publication Data

US 2003/0079218 A1    Apr. 24, 2003

Related U.S. Application Data

(60) Provisional application No. 60/283,303, filed on Apr. 12, 2001.

(51) Int. Cl.
    *G06F 17/30* (2006.01)
(52) U.S. Cl. .............................. 705/10; 705/7
(58) Field of Classification Search .................. 705/14, 705/10
    See application file for complete search history.

(56) References Cited

U.S. PATENT DOCUMENTS

| | | | | |
|---|---|---|---|---|
| 5,236,199 A * | 8/1993 | Thompson, Jr. | ................ | 463/41 |
| 5,758,298 A * | 5/1998 | Guldner | ......................... | 701/23 |
| 6,106,399 A * | 8/2000 | Baker et al. | ..................... | 463/42 |
| 6,304,050 B1 * | 10/2001 | Skaar et al. | ............. | 318/568.11 |
| 7,058,223 B2 * | 6/2006 | Cox | ............................. | 382/190 |
| 2002/0091564 A1 * | 7/2002 | Geller | ............................. | 705/12 |
| 2002/0133405 A1 * | 9/2002 | Newnam et al. | ................ | 705/14 |
| 2002/0173877 A1 * | 11/2002 | Zweig | .......................... | 700/245 |

FOREIGN PATENT DOCUMENTS

WO        93/12614        6/1993

OTHER PUBLICATIONS

Amir et al, "Receiver-driven Bandwidth Adaptation for Light-weight Sessions", ACM Multimedia, Nov. 1997, Seattle, WA.*
Fisher et al, "Audience Interactivity: A case study in three perspectives including remarks about a future production", Proceedings of the Sixth Biennial Symposium for Arts and Technology, New London, Connecticut, Connecticut College, 1997.*
Donath, J. et al. (2001), "Collaborative Tele-directing", *MIT Media Laboratory and UC Berkeley* teleactor@media.mit.edu, 2 pages.
Goldberg, K. et al. Collaborative Online Teleoperation with Spatial Dynamic Voting and a Human "Tele-Actor", *IEEE International Conference on Robotics and Automation*, May 2002, Washington, D.C., 6 pages.

(Continued)

*Primary Examiner* — Romain Jeanty
*Assistant Examiner* — Thomas Mansfield
(74) *Attorney, Agent, or Firm* — Norma E. Henderson

(57) ABSTRACT

A collaborative online tele-operation system allows an audience of many participants to simultaneously share control of a single remote actor, such that the actions of the actor are based on the ongoing collective preferences of the audience.

38 Claims, 5 Drawing Sheets

OTHER PUBLICATIONS

Goldberg, K. et al. "Collaborative Teleoperation Via the Internet", *IEEE International Conference on Robotics and Automation*, Apr. 2000, San Francisco, CA, 6 pages.

The Tele-Actors Guild, "Tele-Direction: A New Framework for Collaborative Telepresence", (2001), *UC Berkeley and MIT Media Laboratory* teleactor@media.mit.edu, 3 pages.

Aoyama, Hisayuki et al., Desktop teleoperation via the World Wide Web, IEEE International Conference on Robotics and Automation, 1995, pp. 660-665, vol. 1.

Arkin, R. et al., Cooperation without communication: Multiagent schema-based robot navigation, J. Robot. Syst., 1992, pp. 351-364, vol. 9, No. 3, Publisher: John Wiley & Sons.

Bejczy, Antal. K., Sensors, controls, and man-machine interface for advanced teleoperation, Science, Jun. 20, 1980, pp. 1327-1335, vol. 208, No. 4450, Publisher: American Association for the Advancement of Science.

Blough, D. M. et al., A comparison of voting strategies for fault-tolerant distributed systems, Proc. 9th Symp. Relaible Distributed Systems, 1990, pp. 136-145, Publisher: IEEE.

Dalton, Barney et al., A distributed framework for Internet telerabotics, Int. Conf. Intelligent Robots and Systems (IROS): Workshop on web robots, 1998, pp. 41-62, Publisher: IEEE, Published in: Canada.

Gertz, Matthew W. et al., A human-machine interface for distributed virtual laboratories, IEEE Robototics and Automation Magazine, Dec. 1994, pp. 5-13, vol. 1, Publisher: IEEE.

Goertz, R.C. et al., Electronically controlled manipulator, Nucleonics, Nov. 1954, pp. 46-47, vol. 12, No. 11.

Goldberg, Kenneth Y. et al., Beyond the Web: manipulating the real world, Computer Networks and ISDN Systems Journal, Dec. 1995, pp. 209-219, vol. 28, No. 1.

Leung, Liu-Wing, Maximum likelihood voting for fault-tolerant software with finite-output space, IEEE Transactions on Reliability, Sep. 1995, pp. 419-427, vol. 44, No. 3, Publisher: IEEE.

Mann, Steve, Wearable computing: A first step toward personal imaging, IEEE Computer, Feb. 1997, pp. 25-31, vol. 30.

Mann, Steve, Humanistic Computing: "WearComp" as a new framework and application for Intelligent Signal Processing, Proceedings of the IEEE, Nov. 1998, pp. 2123-2151, vol. 86, No. 11.

McDonald, Michael J. et al., Virtual collaborative control to improve intelligent robotic system efficiency and quality, Proceedings of the IEEE International Conference on Robotics and Automation, Apr. 1997, pp. 418-424, vol. 1.

Mosher, Ralph S., Industrial Manipulators, Scientific American, 1964, pp. 88-96, vol. 211, No. 4.

Paulos, Eric et al., Ubiquitous tele-embodiment: applications and implications. International Journal of Human-Computer Studies, Jun. 1997, pp. 861-877, vol. 46. No. 6, Publisher: Academic Press Limited.

Paulos, Eric et al., Designing personal tele-embodiment, Proceedings of the IEEE International Conference on Robotics and Automation, May 1998, pp. 3173-3178. vol. 4.

Sato, T. et al., A new micro-teleoperation system employing a hand-held force feedback pencil, Proceedings of the IEEE International Conference on Robotics and Automation, 1994, pp. 1728-1733, vol. 2.

Siegwart, Roland et al., Interacting Mobile Robots on the Web, IEEE International Conference on Robotics and Automation, May 1999.

Tomovic, R., On man-machine control. Automatica, Jul. 1969, pp. 401-404, vol. 5, No. 4, Publisher: Pergamon Press, Published in: Great Britain.

\* cited by examiner

REMOTE COLLABORATIVE CONTROL AND DIRECTION

CROSS-REFERENCE TO RELATED APPLICATION

The application claim priority to the benefit of U.S. Provisional Patent Application Ser. No. 60/283,303 filed on Apr. 12, 2001, the entire contents of which are incorporated by reference herein.

STATEMENT REGARDING FEDERALLY SPONSORED RESEARCH OR DEVELOPMENT

The U.S. Government has a paid-up license in this invention and the right in limited circumstances to require that the patent owner to license others on reasonable terms as provided for by the terms of Grant No. IIS-0113147 by the National Science Foundation.

FIELD OF THE INVENTION

The invention relates generally to remote control of activity and more specifically to collaborative audience control and participation.

BACKGROUND OF THE INVENTION

Although so-called "reality" programs and "webcams" have captured an increasing amount of popular interest, these offer little opportunity for direct interaction with the audience. Indeed, while attempts to facilitate audience participation in television programming have a long history, such efforts have typically been based on illusion. Thus, even programming that involves some degree of audience participation is not truly collaborative—that is, the action the audience sees cannot currently be determined, in real time, by the collective preferences of the audience.

Efforts to involve the audience to a greater degree have included so-called "tele-operation" and "tele-robotics" systems, in which the members of the audience compete for control of the actor in the remote environment. These systems generally permit only a single member of the audience at a time to issue commands to the actor. Once the command is completed, the issuer of the command voluntarily or involuntarily gives up control and the members of the audience compete for the chance to issue the next command to the actor.

Accordingly, there exists a need for a system that supports collaborative control of the actor by multiple members of the audience.

SUMMARY OF THE INVENTION

The present invention provides for real-time "telepresence" that translates collaborative audience preferences into actions that the audience can perceive. In one aspect, the invention supports a "Tele-Actor"—i.e., a mechanical device such as a robot or a biological organism such as a skilled human equipped with cameras, microphones, and wireless communication systems who moves through and interacts with a remote environment. First-person video and audio is transmitted to a base station and then broadcast over the Internet to a number (e.g., tens, hundreds, or thousands) of "Tele-Directors" online. Tele-Directors not only view, but interact with each other and with the remote environment by sending motion and action requests back to the Tele-Actor by clicking on their web browsers. Requests are treated as motion or action votes and are processed at the base station to provide a single stream of commands, which are then conveyed to the Tele-Actor, who responds accordingly.

The group of online Tele-Directors thus collaborates rather than competes for access. The present invention allows large groups of individuals to share in remote experiences. For example, groups of students may collaboratively steer a Tele-Actor through a working steelmill in Japan or through the presidential inauguration, around a newly active volcano or through the streets of Nairobi.

In another aspect, the invention relates to a system for facilitating real-time remote participation in an activity performed by an actor in a remote environment by members of the audience. The environment can be real (i.e., a physical environment) or virtual (i.e., computationally created). The system includes clients for use by the audience and an aggregator in communication with the client. Typically each member of the audience has his or her own client. The client receives the progress of the actor from an aggregator and displays it the members of the audience. The client also receives commands from the members of the audience (i.e., the Tele-Directors) related to the progress of the activity. The aggregator, in turn, receives the commands from the clients and processes them to generate a consensus command, which it forwards to the actor.

The client can be a computational device (e.g., a computer or personal digital assistant (PDA)), and includes a display. An interface that includes, for example, a question area, a chat area, and a voting area is displayed at the client to facilitate interaction among the members of the audience and voting upon a command related to the progress of the activity of the actor.

In another aspect, the invention can be used in educational and journalism applications. Groups of Tele-Directors collaborate to control a resource (e.g., a mechanical device such as a camera or robot). The input from the Tele-Directors is combined to generate a control stream for the resource.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
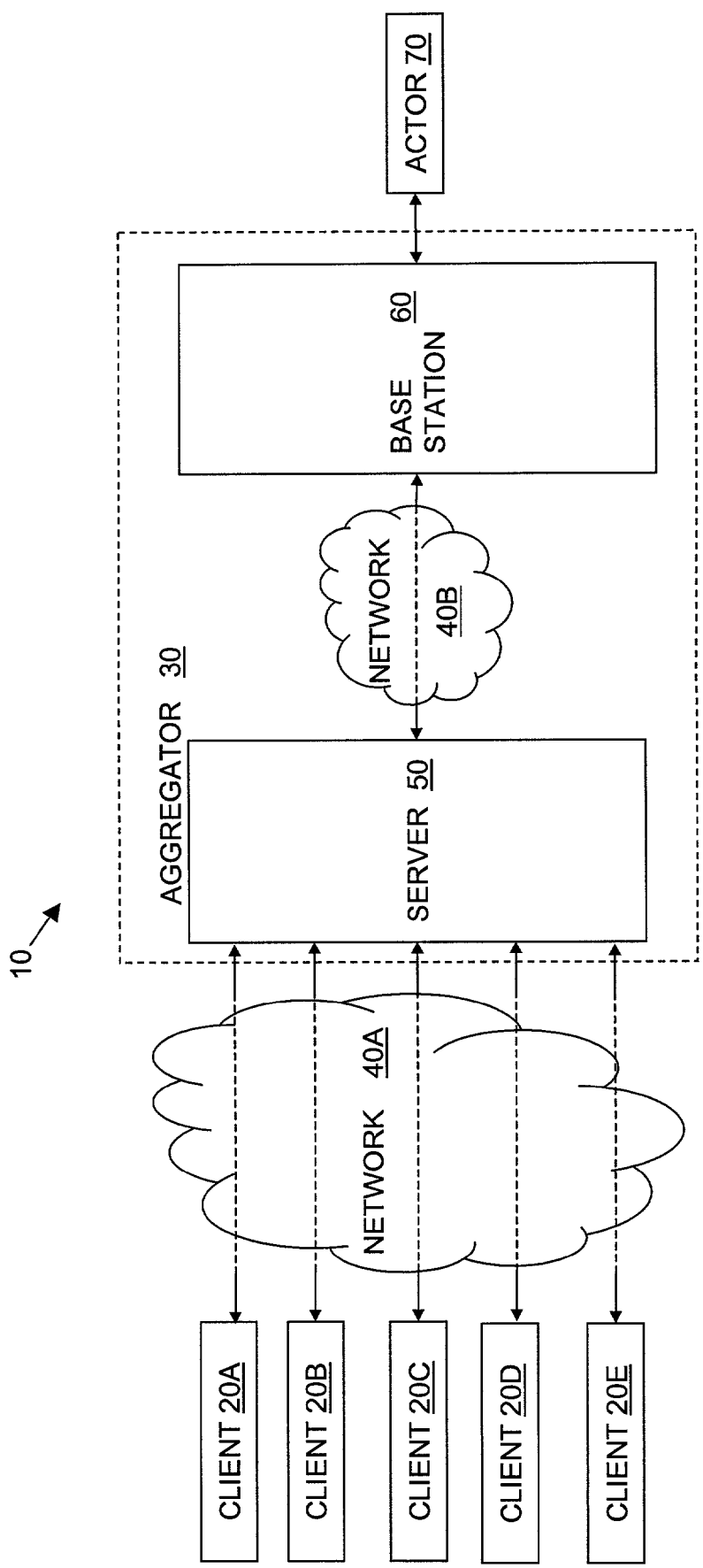
FIG. 1 is a block diagram of an embodiment of a system in accordance with the principles of the present invention.

With reference to FIG. 1, a system 10 for facilitating remote participation in an activity monitorable by an audience includes a series of clients 20A, 20B, 20C, 20D, 20E (referred to generally as client 20) in communication with an aggregator 30 through a first network 40A. An aggregator 30 can include a server 50 in communication with a base station 60 through a second network 40B. Alternatively, the server 50 and the base station 60 can be a single computer. The aggregator 30, or alternatively the base station 60, is in communication with an actor 70 or a controllable resource. Networks 40A, 40B may be, for example, different computer or telecommunications networks or the Internet.

In one embodiment, the server 50 can be a computer including an AMD K7 950 MHz processor with 1.2 gigabytes of memory connected to a 100 megabytes per second T3 line. The base station 60 can be a Dell laptop computer including a Pentium III 600 MHz processor with 64 megabytes of memory connected to a 10 megabytes per second T1 line. The server 50 establishes a connection with the base station 60 though the second network 40B via a socket. The base station 60 can include a card interface, e.g., a USB video card.

The actor 70 can be equipped with an apparatus (not shown) for capturing and transmitting the sites and sounds of the remote environment of the actor 70. The apparatus can, for example, include a Swann MicroCam wireless video camera that provides a 2.4 GHz analog RF output and transmits line-of-sight up to approximately 300 feet with a resolution of 380 horizontal lines.

The clients 20 preferably include a custom Internet browser interface based on DHTML. The base station 60 preferably includes image selection interface software. The base station 60 captures images from the actor 70 and attaches textual questions to the images, which are transmitted to the server 50 for distribution to the clients 20. The server 50 maintains a database of the questions and images and communicates with the client 20.

The base station 60 communicates with the actor 70 via a wireless interface (e.g., IEEE 802.11 or Bluetooth). Typically the actor 70 is located in an environment remote from the audience and clients 20. In other words, the clients 20 are geographically distributed relative to the environment of the actor 70. The Tele-Directors share control of the actor 70 from their Internet browsers running on the client 20.

In operation, the Tele-Directors view and monitor the activity of the actor 70 at the clients 20. As the actor 70 moves through the remote environment, video images are captured at the base station 60 and streamed back to the server 50 for distribution as, for example, .jpg images to the clients 20 along with audio signals received from the actor 70 over a wireless microphone or a cellular phone. Alternatively, real-time video (and, if desired, audio) is streamed to the clients 20. The Tele-Directors respond to questions embedded within the images relating to the progress of the actor 70. The responses are collected by the server 50 and aggregated to generate a consensus command, which is forward through the second network 40B to the base station 60. In one embodiment, a base station operator (not shown) relays the consensus command to the actor 70 though a wireless audio channel. Alternatively, the actor 70 may be equipped with wireless communication device, such as a PDA, which receives the consensus command directly from the base station 60. The wireless communication device used by the actor 70 can facilitate viewing of an interface (not shown). The interface facilitates sending information relating to the remote environment for monitoring by the Tele-Directors, and receiving the consensus command. Optionally, the interface allows the actor 70 to request a vote from the Tele-Directors and provide feedback about the command to the Tele-Directors.

Figure 2:
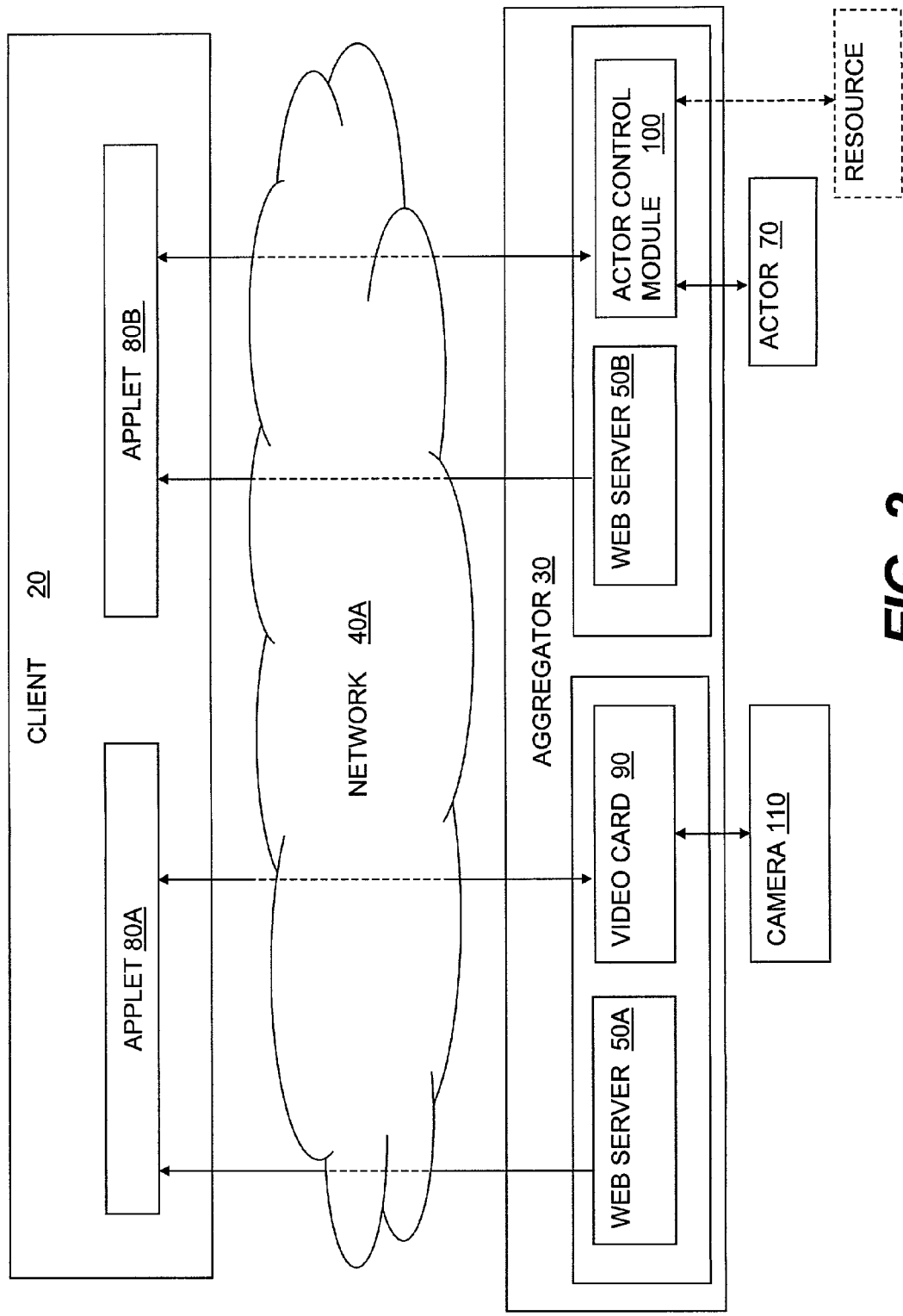
FIG. 2 is a block diagram of an embodiment of a client and the aggregator shown in FIG. 1.

With reference to FIG. 2, in one embodiment of the client 20 and the aggregator 30, the client 20 includes a first applet 80A and a second applet 80B. The applets are received from the aggregator 30 through the network 40A (e.g., the Internet) via a socket and execute as running processes. The aggregator 30 includes a first web server 50A, a second web server 50B, a video card 90, and an actor control module 100. The video card 90 is in communication with a camera 110 that monitors the activity of the actor 70. The actor control module 100 is in communication with the actor 70. The aggregator can be a single computer or a plurality of computers (e.g., two) each performing specific functions.

In one embodiment, the web server 50A runs software for providing the video images or live video. The video card can provide either full motion capture, at, for example, 30 frames per second, or single still image captures. The driver for the video card 90 facilitates configuration of the resolution rates, color resolution, hue, contrast, color, and brightness.

The web server 50B handles HTML client requests. The actor control module 100 can also reside and execute on the same computer as the server 50B. The actor control module 100 can be attached to the actor 70 (e.g., as a robotic arm) though an RS-232 serial connection.

In operation, the applet 80A and the web server 50A provide live streaming video feedback related to the progress of the actor 70 captured by the camera 110 and video card 90. That is, the applet 80A actually manages presentation of video (and, possibly, audio) information from the actor 70 on the client 20. The applet 80B and the web server 50B, in turn, coordinate control of the actor 70. Input from the Tele-Directors is received by the applet 80B and forwarded to web server 50B for aggregation. The aggregation by the web server 50B results in a consensus command, which is forwarded to the actor 70 for performance. The resulting progress of the actor is viewed by the Tele-Directors using the camera 110 (and if desired, an audio device), the video card 90, the web server 50A and the applet 80A as described above.

Figure 3A:
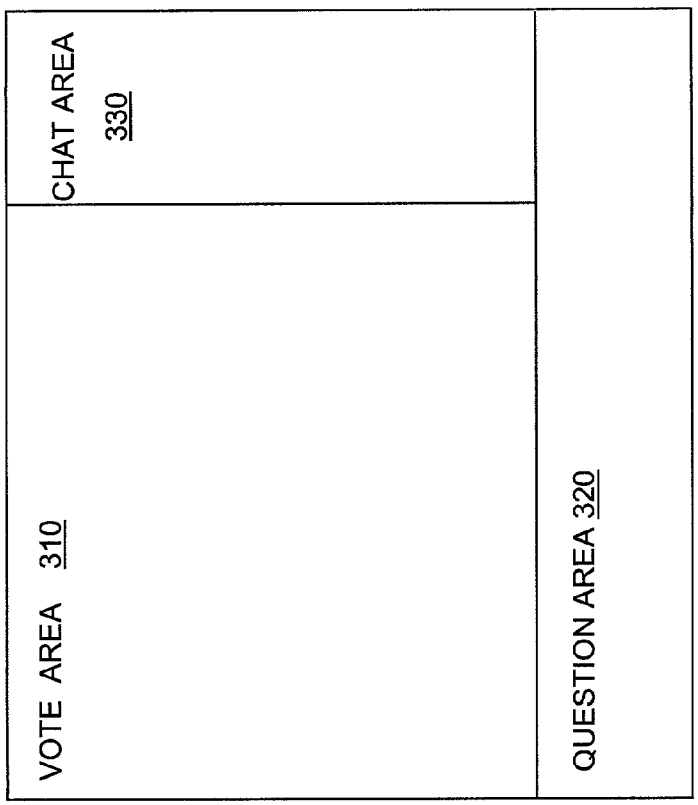
FIGS. 3A-3E are embodiments of a voting interface displayed at the client.

FIGS. 3A-3D depict different embodiments of a voting interface 300 displayed at the clients 20. With reference to FIG. 3A, the voting interface 300 includes a voting area 310, a question area 320, and chat area 330. The voting interface 300 can be realized as a graphical user interface (GUI). Questions or choices related to the future activity of the actor 70 are displayed in the question area 320. The questions can be randomly chosen from a database of questions, provided by the Tele-Directors, or provided by a base station operator located at the base station 60. The Tele-Directors respond to the question by placing a "votel" (i.e., an indicator associated with each Tele-Director using the system) in the vote area 310 thereby indicating their respective response to the question. Each question can have a limited response period (e.g., one minute). Within the response period, the Tele-Directors may change their responses. For example, a Tele-Director may wish to change his or her vote in response to postings displayed in the chat area 330 from other Tele-Directors lobbying for a specific response. After the response period expires, the votels are analyzed to generate the consensus command, which is in turn forwarded to the actor 70. Alternatively, the votes from the Tele-Directors can be analyzed in a continuous, dynamic fashion to provide a prediction of the consensus command prior to the expiration of the response period.

Figure 3B:
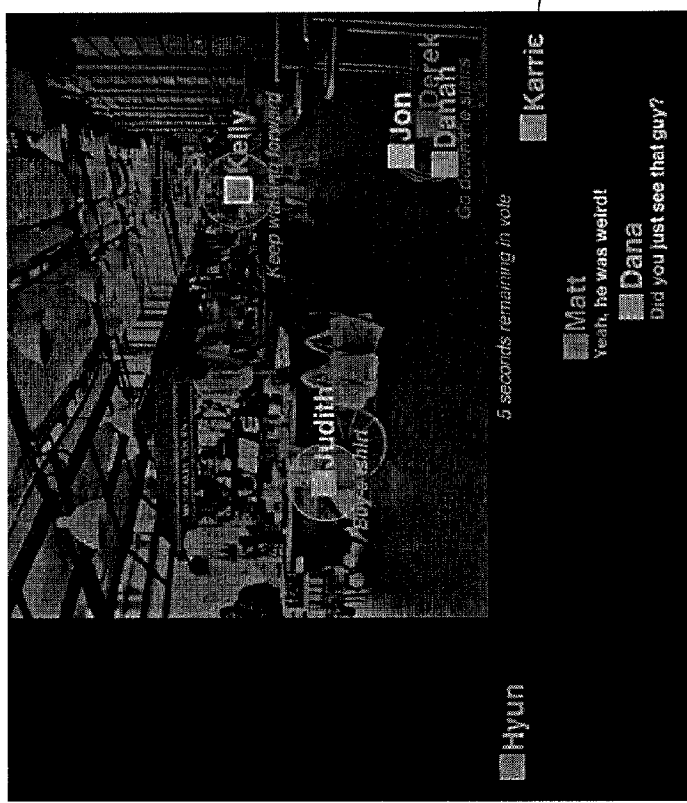

With reference to FIG. 3B, in one exemplary embodiment, the system 10 is used to control the actions of a biological organism (e.g., a snake), preferably a real or animated mammal (e.g., a human). The voting interface 300 displays a shopping environment in the voting area 310. In this embodiment, the question area 320 and voting area 310 are integrated. A votel 340 is associated with each Tele-Director logged into the system. While a Tele-Director's votel is outside the voting area 310, that Tele-Director may present textual information to the other Tele-Directors. The text is displayed below the Tele-Director's votel.

When a vote is to take place, the live audio/video stream may be paused and a still picture displayed, such as that shown in FIG. 3B; alternatively, streaming may continue without pause. The Tele-Directors select a portion of the picture and post, by typing, a choice (goal) for the progress of the actor. A transparent circle appears, accompanied by the text that defines the choice in a color associated with Tele-Director. The Tele-Directors vote for choices by moving their respective votels into the corresponding transparent circles. Each Tele-Director may post multiple choices but may only vote for a single choice. After the expiration of the voting period the totals for each choice are determined and the winning choice (i.e., the most popular choice) is forwarded to the actor 70.

Alternatively, a simple economy in which Tele-Directors spend points to vote or post goals can be used to control the number of votes and or choices for a given voting period. Each Tele-Director starts with a limited number of points. The Tele-Directors pay to post a goal, to vote, and to change a vote. Points can be replenished over time and bonuses given for voting for, or posting, the winning choice. Different economic models may be employed for different types of applications. For example, in a distance learning context, it may be appropriate to encourage all questions; even those questions that are not chosen for immediate presentation to the speaker might facilitate useful discussion among the Tele-Directors.

Figure 3C:
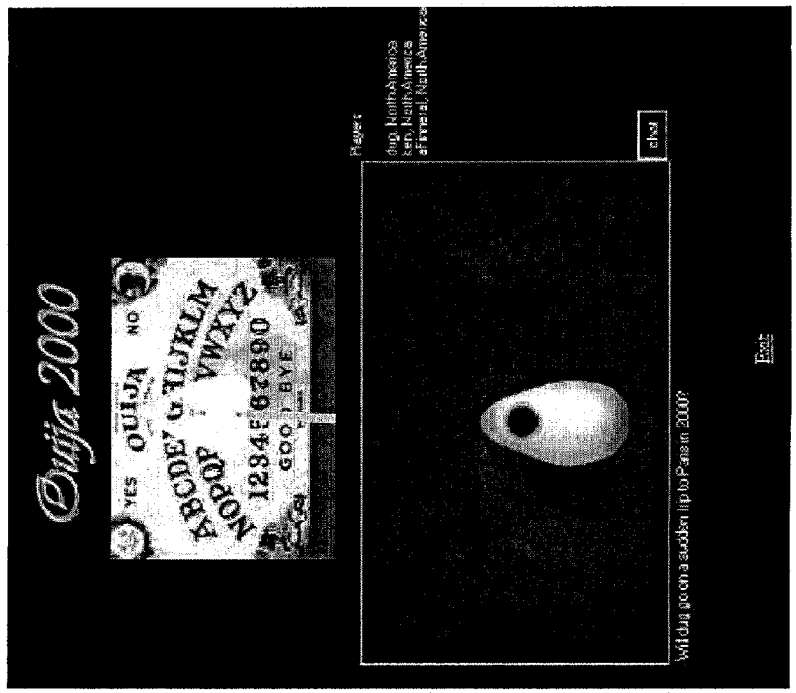

With reference to FIGS. 2 and 3C, in another embodiment the Tele-Directors control a robot arm which moves a planchette on a Ouija board. In operation, the applet 80B displays a small window with a representation of the planchette (a "virtual" planchette). The applet 80B also displays two text panels: one listing currently registered clients and another containing the question being considered. The applet 80B establishes communication with server SOB either directly via a bus, if it is located on the same machine, or through a socket connection. Through this connection, the clients send desired force or motion vectors (as described below) to server 50 at regular time intervals (e.g., every 3 seconds). The server 50B aggregates the force commands from all the clients and generates a consensus command, which is forwarded to the robot arm. The server 50B also transmits information about the current question being asked and the clients currently registered back to the instance of the applet 80B at each client 20.

As described above, the applet 80B at each client sends a desired motion vector to the server 50B at a periodic rate. At the client, the position of a mouse (or other pointing device) associated with the client is read by a local java applet and the virtual planchette is displayed in the lower window of the voting interface. The virtual planchette tracks the motion of the mouse as it is moved by the client user. The planchette motion is preferably based on an inertial model to generate force or motion vectors.

In one embodiment, a vector from the center of the planchette screen to the current mouse position is treated as a force command. The user of a client i specifies desired acceleration by moving the mouse, and the acceleration is expressed in two dimensions x, y as $a=(a_{ix}; a_{iy})$. Frictional drag of the planchette may be modeled with a constant magnitude and a direction opposite the current velocity of the planchette. If the current velocity of the planchette in two dimensions is $v_0=(v_{0x}; v_{0y})$ and the magnitude of the constant frictional acceleration is $a_f$, then $$a_{fx} = a_f - \frac{v_{0x}}{\sqrt{v_{0x}^2 + v_{0y}^2}}, \text{ and } a_{fy} = a_f \frac{-v_{0y}}{\sqrt{v_{0x}^2 + v_{0y}^2}}.$$

The resulting velocity v of the planchette is $v=v_0+(a+a_f)\Delta t$. The virtual planchette is preferably updated locally 30 times a second, therefore $\Delta t=0.03$ seconds. Summing the inputs from all clients yields the consensus command (i.e., the net desired acceleration of the planchette).

The consensus command is forwarded to the actor (in this case, the robot arm), and is accepted in form of a desired goal point and speed. To prevent the robot arm from moving outside the viewable region, the calculated goal point is limited to the boundary of the region. For example, with an x, y region defined by $0<x<W$ and $0<y<L$, the current position of the robot is projected in direction v until it hits the boundary. Let $\theta=\tan^{-1}(v_y/v_x)$. To calculate the goal point, the following equation for y corresponds to each of the four possible regions of $\theta$:

$$0° \leq \theta < 90°\ \ y=\min(L, y_0+(W-x_0)\tan\theta)$$

$$90° \leq \theta < 180°\ \ y=\min(L, y_0+(-x_0)\tan\theta)$$

$$180° \leq \theta < 270°\ \ y=\max(0, y_0+(-x_0)\tan\theta)$$

$$270° \leq \theta < 360°\ \ y=\max(0, y_0+(W-x_0)\tan\theta).$$

Therefore $x=x_0+[(y-y_0)/\tan\theta]$. The robot control module 100 is sent a move command toward goal point (x,y) with speed $v=\sqrt{v_x^2+v_y^2}$. This procedure is preferably repeated every 3 seconds.

Figure 3D:
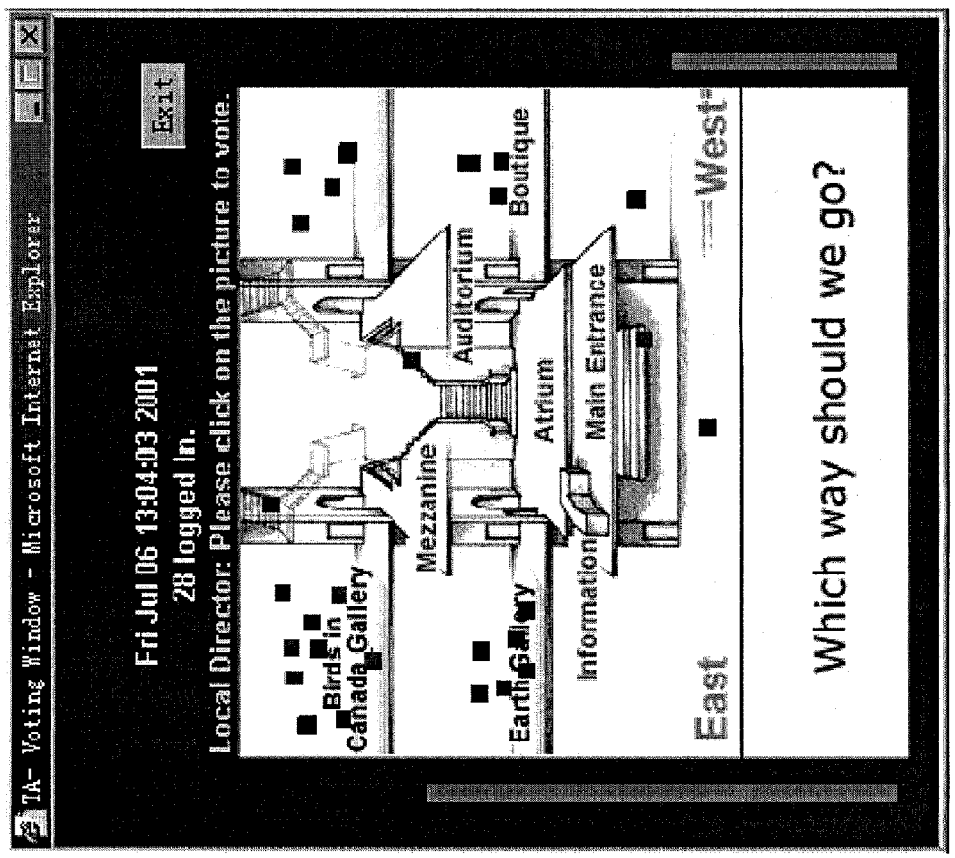

With reference to FIGS. 1 and 3D, in another embodiment a "Spatial Dynamic Voting" (SDV) interface facilitates interaction and collaboration among the remote clients 20. FIG. 3D illustrates the SDV interface displayed by the browsers of all active clients. The users of the clients 20 register online to participate in collaborative control of the actor by selecting a votel color and submitting their email addresses to the server 50, which stores this information in a database and sends back a password via email. The server 50 also maintains a tutorial and a frequently asked questions section to familiarize new clients with system operation.

Using the SDV interface, clients participate in a series of short (e.g., one minute) "elections." Each election is based on a single image with a textual question. In FIG. 3D, the actor 70 is visiting an architectural site. The election image shows a building with the question: "Where should we go next?" The clients click on their respective displays to position their votels. Using the HTTP protocol, the clients 20 transmit the positions of the votels back to the server 50 and appear in an updated election image sent to all the clients every 6-20 seconds. The updated image allows the Tele-Directors to change their votes several times during an election. When the election is completed, a clustering algorithm (described in more detail below) can analyze the pattern of the votes to determine a single command for the actor. The SDV interface differs from multiple choice polling because it allows spatially and temporally continuous inputs.

To facilitate client training and asynchronous testing, the system 300 can include two modes of operation, offline and online. In offline mode, all election images are extracted from a prestored library of images resident, for example, in a database at the server or the base station. In online mode, election images are sampled from the live video captured by the actor. Both offline and online SDV modes have potential for collaborative education, testing, and training.

The consensus command can be automatically extracted from the positions of the votels. A votel may be defined as a vector $v_i=[u, x, y, t]$, where u is a client identifier, x and y indicate a two-dimensional location in the election image, and t indicates the time when the votel was received at the server. During each election, the server collects a set of votels V. The collection V is analyzed to determine voting patterns in terms of goals and collaboration.

Conventional clustering algorithms can be used to identify groups of neighboring votels to thereby generate the consensus command. After votels are classified into groups, one approach is to compute the convex hull of each group with three or more votels and treat each convex polygon as a distinct response to the question. When the actor is restricted to movements on a floor, the horizontal positions of votels provide the primary navigation information. In such cases, all votels are projected onto the horizontal axis and a conventional nearest neighbor algorithm is employed to perform one-dimensional incremental interval clustering. After all votels are collected and their clusters analyzed, the goal with maximum votes (as identified by the clustering analysis) is selected for execution by the actor.

The invention can also provide information concerning the degree of collaboration among the Tele-Directors based on how the votels are spatially correlated. For each question i, a votel density ratio $c_i$ is computed:

$$c_i = \frac{d_i}{d} = \frac{\frac{n_i}{a_i}}{\frac{N}{A}} = \frac{n_i}{N}\left(\frac{A}{a_i}\right)$$

where $d_i$ is the votel density (votes per unit area) for goal i, d is the overall average votel density, $n_i$ is number of votel in goal i, $a_i$ is the area or width of the goal i, N is the total number of votes and A is the area of the election image. This metric is proportional to the ratio n/N and inversely proportional to the area of the goal region. The metric is high when many votes are concentrated in a small goal region (high collaboration) and low when votes are uniformly spread among multiple goals (low collaboration). The overall collaboration level for each election can also be computed by:

$$c = \frac{\sum n_i}{\sum a_i}\frac{A}{N}$$

When all votes fall into goal regions, $$c = \frac{A}{\sum a_i}$$

provides a measure of how focused the votels are.

Figure 3E:
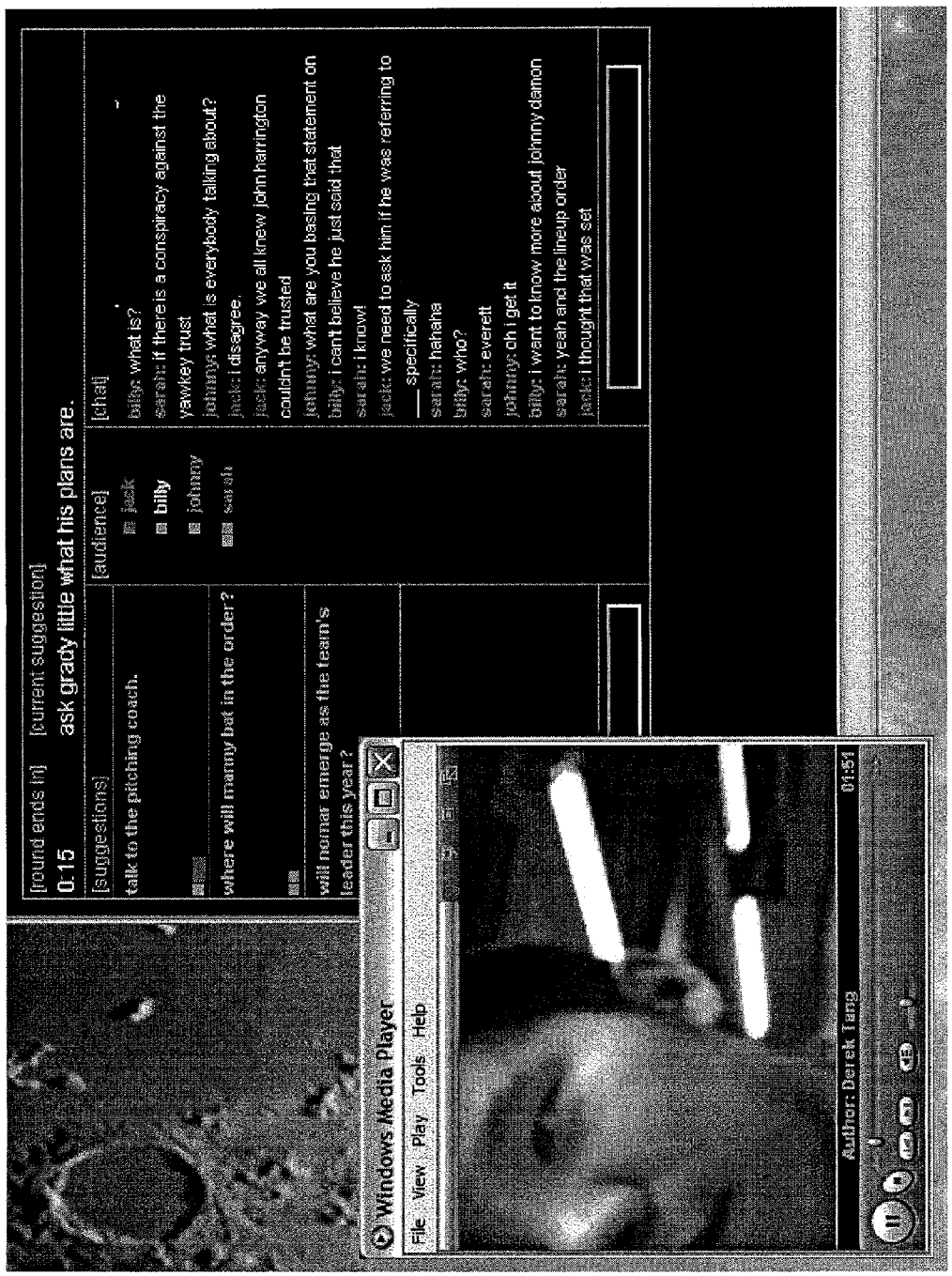

FIG. 3E depicts an embodiment 400 of the voting interface which can be used in a journalistic or educational environment. The Tele-Directors can post potential commands as text. In turn, the Tele-Directors vote on these commands by using an input device (e.g., a mouse) to indicate which command they prefer. The Tele-Directors can also change or remove their votes as they desire. Each Tele-Director can have, for example, five votes to distribute as he or she wishes. That is, a Tele-Director can vote five times for a single command, or give a single vote to a number of different commands, etc. Voting is continuous and dynamic, and the Tele-Directors may chose to erase votes because a command is no longer relevant to the current situation in the remote environment displayed via the voting interface 400. A voting round ends when the actor 70 calls for a consensus command. The command with the most votes can be chosen as the consensus command and sent to the actor 70. In turn, the actor has the ability to reject the consensus command, and the Tele-Director who proposed (or those Tele-Directors who voted for) the rejected command are penalized by, for example, losing several votes for a specific number of subsequent voting rounds. This embodiment may employ streaming video and audio for awareness of the actor's situation. Additionally, the interface can include a chat space facilitating communication among the Tele-Directors.

Having shown the preferred embodiments, one skilled in the art will realize that many variations are possible within the scope and spirit of the claimed invention. It is therefore the intention to limit the invention only by the scope of the claims.

What is claimed is:

1. A method of facilitating remote participation in an activity monitorable by an audience comprising a plurality of members, the method comprising the steps of:
   a. facilitating remote monitoring of the activity by the audience;
   b. receiving at least one client implemented on a computer system comprising a computer processor, within a response period, first input commands from multiple audience members concerning progress of the action, wherein each first input command is in the form of a votel, wherein a votel is an indicator, associated with an individual audience member, that is placed by an audience member onto a visual representation of the activity environment by the individual audience member to indicate the individual audience member's choice of input command, each votel being defined as a vector or function of the individual audience member, the time of placement of the votel onto the visual representation of the activity environment, and the coordinates of the physical location of the placed votel within the visual representation of the activity environment;
   c. presenting, in a continuous, dynamic fashion, the first input commands received from all audience members to the audience;
   d. accepting, at the at least one computer system-implemented client from individual audience members within the response period, revised input commands in the form of the position of a votel placed by an audience member onto a visual representation of the activity environment;
   e. presenting, in a continuous, dynamic fashion, any revised input command received from any individual audience member in place of the first input command received from that audience member along with all other input commands received during the response period;
   f. processing the received input commands from all audience members using an aggregator implemented on a computer system to develop a consensus command derived from the coordinates of the votels, wherein the votels are classified into clusters based on their associated coordinates and the clusters are analyzed to determine the consensus command; and
   g. directing at least one future action according to the consensus command.

2. The method of claim 1, wherein the step of facilitating remote monitoring comprises displaying the activity to the audience on at least one display device.

3. The method of claim 1, wherein the step of facilitating remote monitoring comprises:
   i) receiving at least one of an audio and a video signal of the activity at a base station, the activity being performed in a remote environment relative to the audience; and
   ii) transmitting the at least one received signal to the audience over a network.

4. The method of claim 3, wherein the step of receiving comprises receiving the at least one signal from an apparatus associated with a tele-actor performing the activity in the remote environment.

5. The method of claim 3, wherein the step of transmitting comprises:
forwarding the at least one received signal from the base station to a server; and
distributing the at least one received signal from the server to the audience.

6. The method of claim 3, wherein the remote environment is a real physical environment.

7. The method of claim 3, wherein the remote environment is a virtual computationally generated environment.

8. The method of claim 1, wherein the step of receiving commands from the audience comprises:
i) providing a voting interface to each member of the audience;
ii) presenting the audience with at least one choice concerning progress of the activity;
iii) facilitating voting, by at least one member of the audience, for a choice concerning progress of the activity; and
iv) forwarding the at least one vote to a server.

9. The method of claim 8, wherein the step of forwarding comprises forwarding the vote through a network to the server.

10. The method of claim 8, wherein the voting interface comprises:
a question area facilitating posting of at least one question and at least one choice concerning the progress of the activity;
a chat area facilitating communication between members of the audience; and
a voting area used by the audience to indicate a response to the at least one choice presented in the question area.

11. The method of claim 10, wherein the step of voting for a choice comprises placing a vote indicator in the voting area of the voting interface.

12. The method of claim 1, wherein a plurality of commands is received, the step of processing comprising performing cluster analysis on the received commands.

13. The method of claim 1, wherein a plurality of commands is received, the step of processing comprising weighting each received command.

14. The method of claim 13, wherein the step of weighting each received command comprises weighting each command relative to the member of the audience submitting the command.

15. The method of claim 1, wherein the step of processing comprises processing at least one motion vector.

16. The method of claim 1, wherein the step of using the consensus command comprises:
i) receiving the consensus command at a base station; and
ii) forwarding the consensus command to a tele-actor performing the activity in a remote environment relative to the audience.

17. The method of claim 16, wherein the tele-actor is a mechanical device.

18. The method of claim 17, wherein the mechanical device is a robot.

19. The method of claim 16, wherein the tele-actor is a biological organism.

20. The method of claim 19, wherein the biological organism is a mammal.

21. The method of claim 20, wherein the mammal is a human.

22. The method of claim 1, further comprising the steps of:
generating, using the aggregator, predicted consensus commands during the response period from the set of current commands; and
presenting the predicted consensus commands to the audience during the response period.

23. The method of claim 1, further comprising the step of determining a degree of collaboration among the audience members based on spatial correlation of the commands received during a response period.

24. The method of claim 23, the step of determining a degree of collaboration among the audience members further comprising the steps of:
for each question i, compute a votel density ratio, $c_i$:

$$c_i = \frac{d_i}{d} = \frac{\frac{n_i}{a_i}}{\frac{N}{A}} = \frac{n_i}{N}\left(\frac{A}{a_i}\right)$$

wherein $d_i$ is the votel density for goal i, d is the overall average votel density, $n_i$ is number of votels in goal i, $a_i$ is the area or width of the goal i, N is the total number of votels and A is the area of the election image, such that the degree of collaboration is high when $c_i$ is large and low when $c_i$ is small; and
for each election, compute the degree of overall collaboration by:

$$c = \frac{\sum n_i}{\sum a_i} \frac{A}{N}.$$

25. A system of facilitating remote participation in an activity monitorable by an audience comprising a plurality of members, the activity being performed by at least one actor in an environment remote from the audience, the system comprising:
at least one computer processor specifically adapted to provide:
at least one client associated with the audience for facilitating monitoring of the activity by the audience via a visual display, for receiving, via a user interface, within a response period, first input commands from multiple audience members concerning the progress of the action, for presenting, in a continuous, dynamic fashion on the visual display or using an auditory or visual display device, the first input commands received from all audience members to the audience, for accepting, via the user interface, revised input commands from individual audience members within the response period, and for presenting, in a continuous, dynamic fashion on the visual display or using an auditory or visual display device, any revised input command received from any individual audience member in place of the first input command received from that audience member along with all other input commands received during the response period;
a voting interface that presents a visual representation of the activity environment and accepts input commands from the user interface in the form of the position of a votel wherein a votel is an indicator, associated with an individual audience member, that is placed by each audience member directly onto the visual representation of the activity environment by the individual audience member to indicate the individual audience member's choice of input command, each votel being defined as a vector or function of the individual audience member, the time of placement of the votel onto the visual representation of the activity environment, and the coordinates of the physical location of the placed votel within the visual representation of the activity environment; and an aggregator in communication with the at least one client and the at least one actor for (i) processing the received input commands from all audience members concerning the progress of the action to generate a consensus command derived from the coordinates of the votels, wherein the votels are classified into clusters based on their associated coordinates and the clusters are analyzed to determine the consensus command, (ii) forwarding, via a communications interface device, the consensus command to the actor, and (iii) transmitting the activity to the client for further monitoring by the audience on the visual display.

26. The system of claim 25, wherein the aggregator comprises:
a server in communication with the client for (i) processing the commands to generate the consensus command and (ii) forwarding the activity of the actor to the client for monitoring by the audience; and
a base-station in communication the server and the actor, for receiving the consensus command from the server and transmitting the activity to the server.

27. The system of claim 25, wherein the actor is a mechanical device.

28. The system of claim 27, wherein the mechanical device is a robot.

29. The system of claim 27, wherein the mechanical device is a camera.

30. The system of claim 25, wherein the actor is a biological organism.

31. The system of claim 30, wherein the biological organism is a mammal.

32. The system of claim 31, wherein the mammal is a human.

33. The system of claim 25 further comprising an apparatus associated with the actor for transmitting the activity to the aggregator.

34. The system of claim 25, wherein the client is a computing device comprising:
a display for facilitating monitoring of the activity and voting for a choice of action concerning the progress of the activity;
a processor for processing the vote to generate a command concerning the progress of the activity; and
a network interface for (i) transmitting the command to the aggregator and (ii) receiving the activity of the actor from the aggregator.

35. The system of claim 34, wherein the display comprises:
a question area facilitating posting of at least one question and at least one choice concerning the progress of the activity;
a chat area facilitating communication between members of the audience; and
a voting area used by the audience to indicate a response to the at least one choice presented in the question area.

36. The system of claim 25, wherein the aggregator generates predicted consensus commands during the response period from the set of current commands and the client presents the predicted consensus commands to the audience.

37. The system of claim 25, wherein the aggregator determines a degree of collaboration among the audience members based on spatial correlation of the commands received during a response period.

38. The system of claim 37, wherein the degree of collaboration among the audience members is determined by:
for each question i, compute a votel density ratio, $c_i$:

$$c_i = \frac{d_i}{d} = \frac{\frac{n_i}{a_i}}{\frac{N}{A}} = \frac{n_i}{N}\left(\frac{A}{a_i}\right)$$

wherein $d_i$ is the votel density for goal i, d is the overall average votel density, $n_i$ is number of votels in goal i, $a_i$ is the area or width of the goal i, N is the total number of votels and A is the area of the election image, such that the degree of collaboration is high when $c_i$ is large and low when $c_i$ is small; and for each election, compute the degree of overall collaboration by:

$$c = \frac{\sum n_i}{\sum a_i} \frac{A}{N}.$$

* * * * *